Feb. 24, 1970   P. T. DELMER ET AL   3,496,747
NUMERICALLY CONTROLLED SPINNING MACHINE
Filed Sept. 21, 1967   14 Sheets-Sheet 1

INVENTORS.
PHILIP T. DELMER
RAMON F. TORRES
BY Parker & Carter
Attorneys.

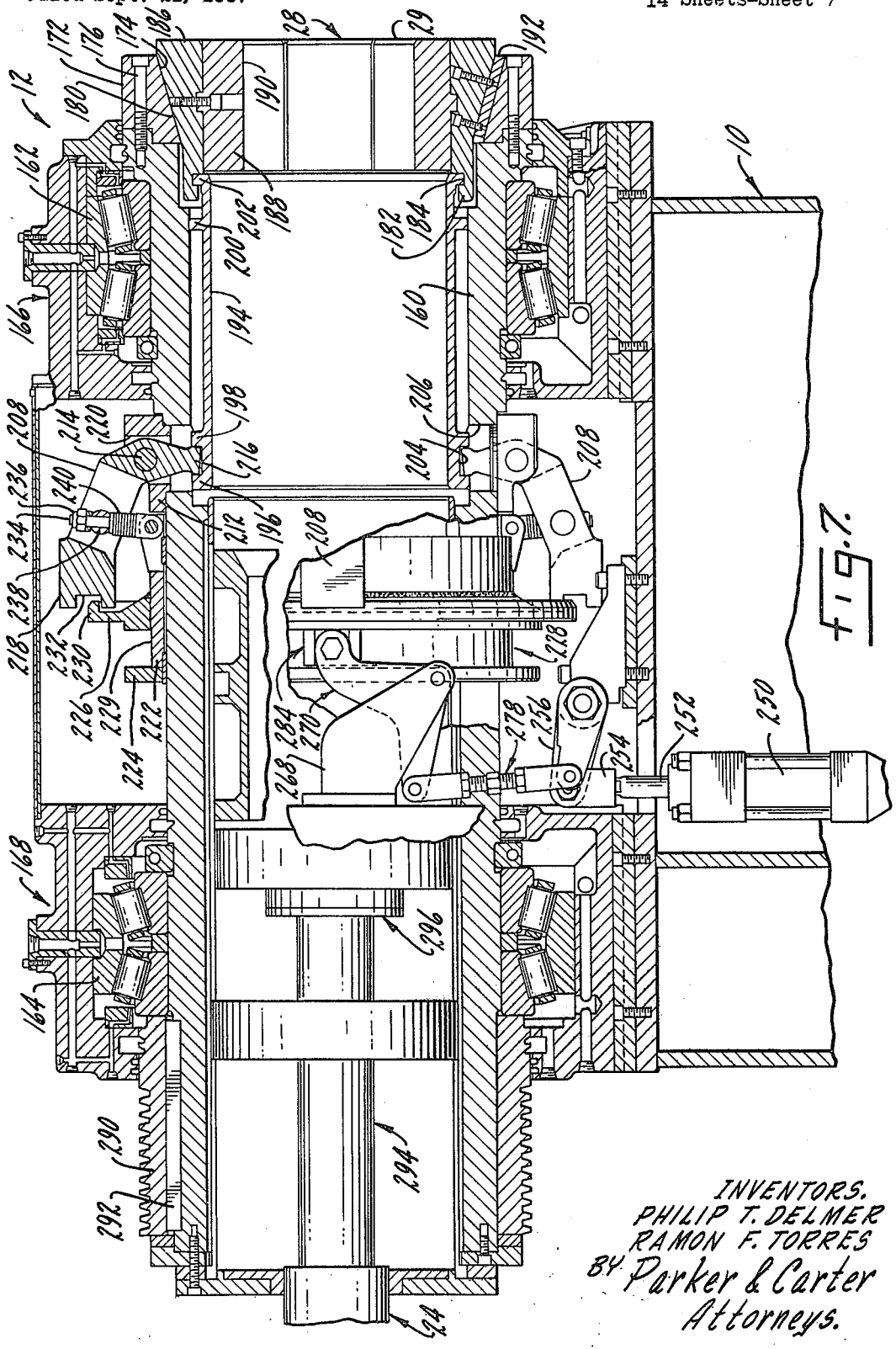

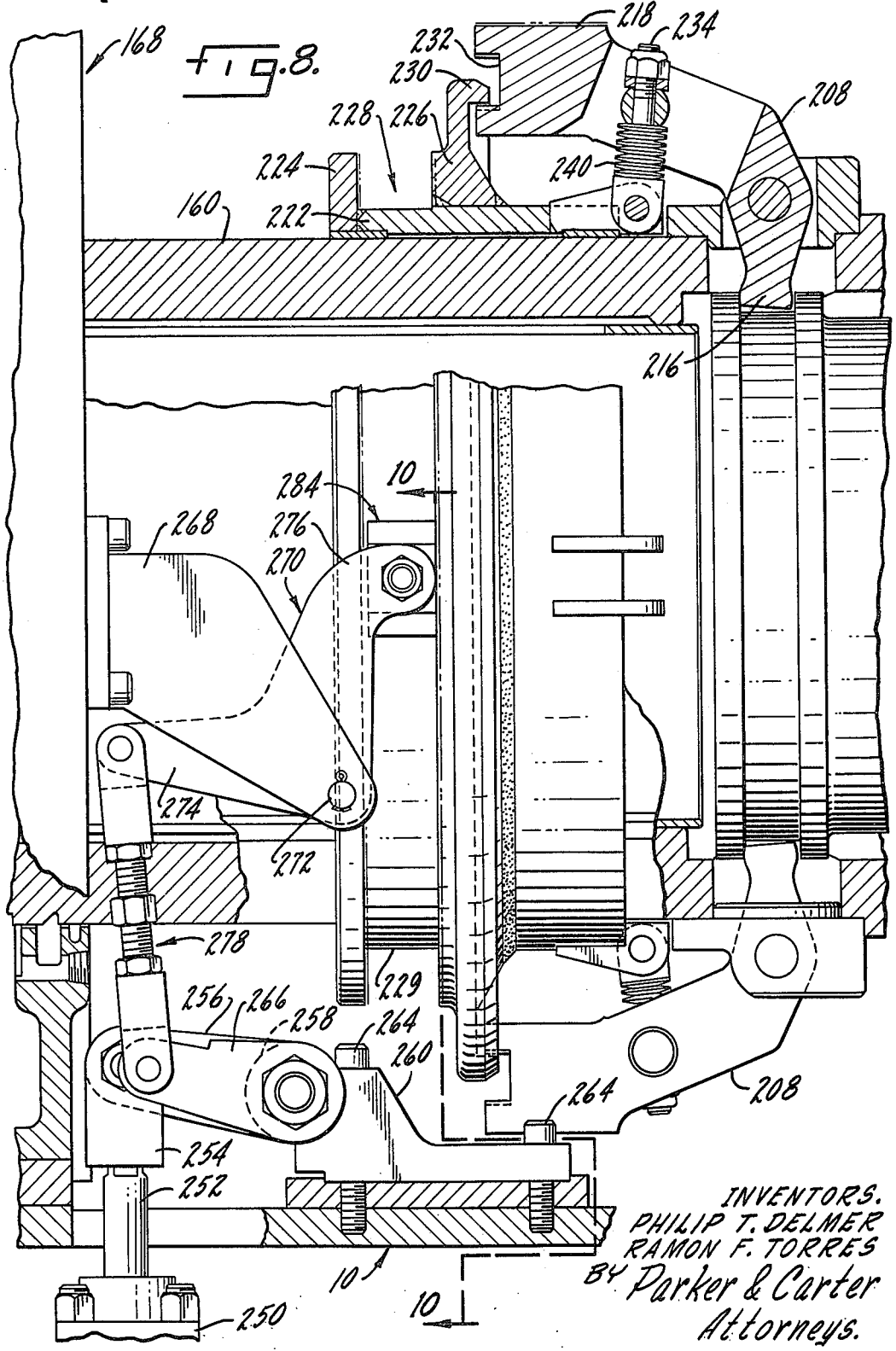

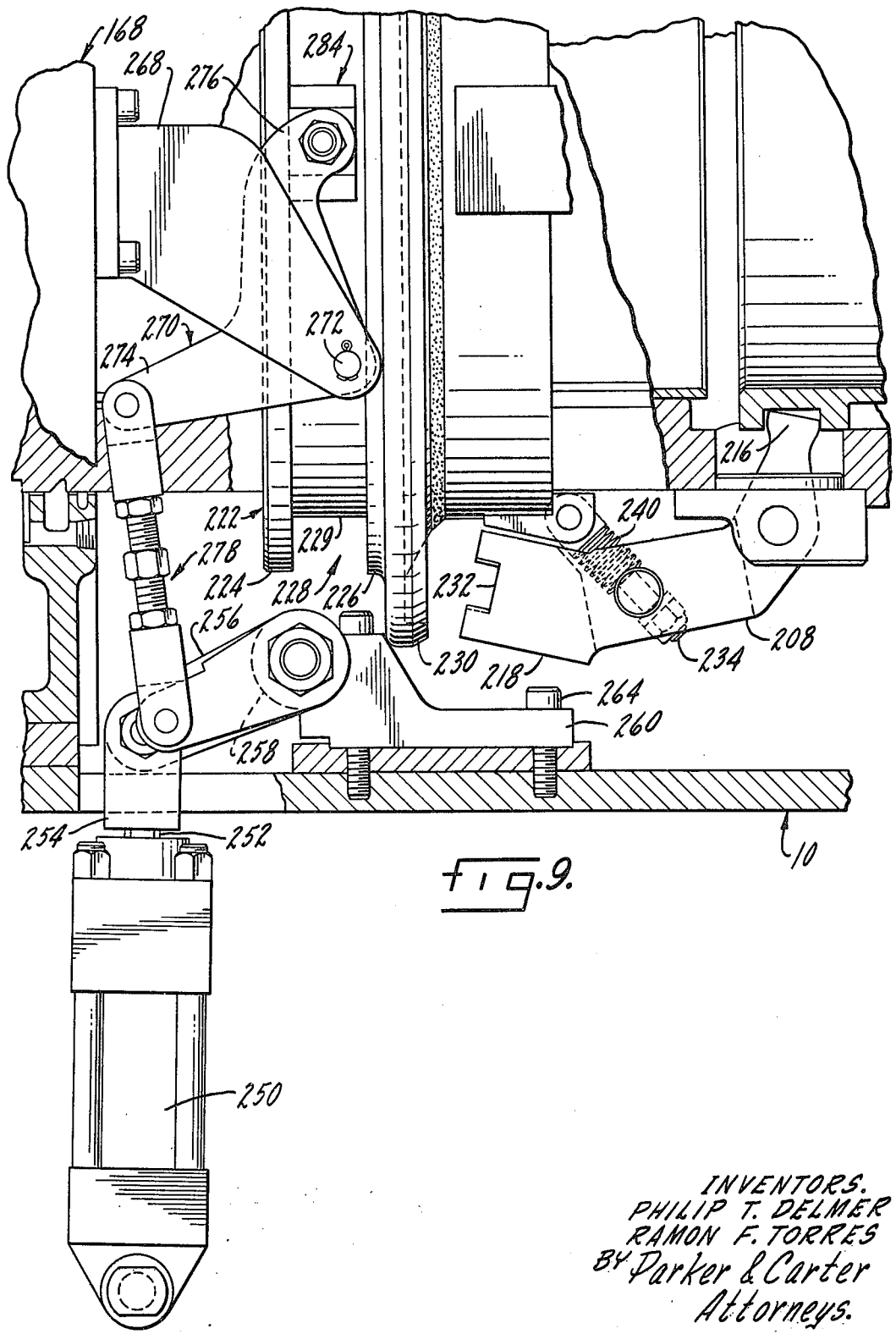

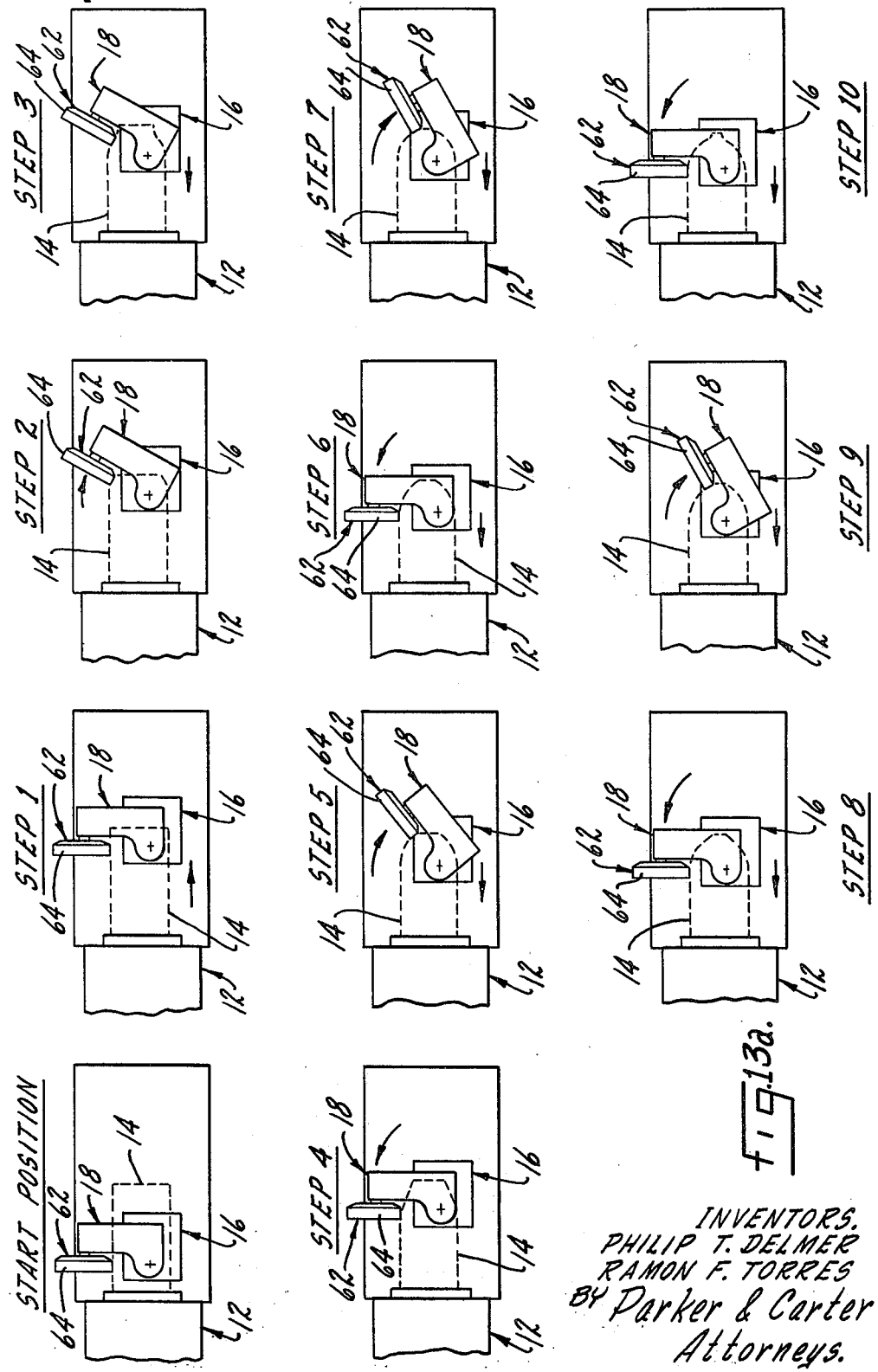

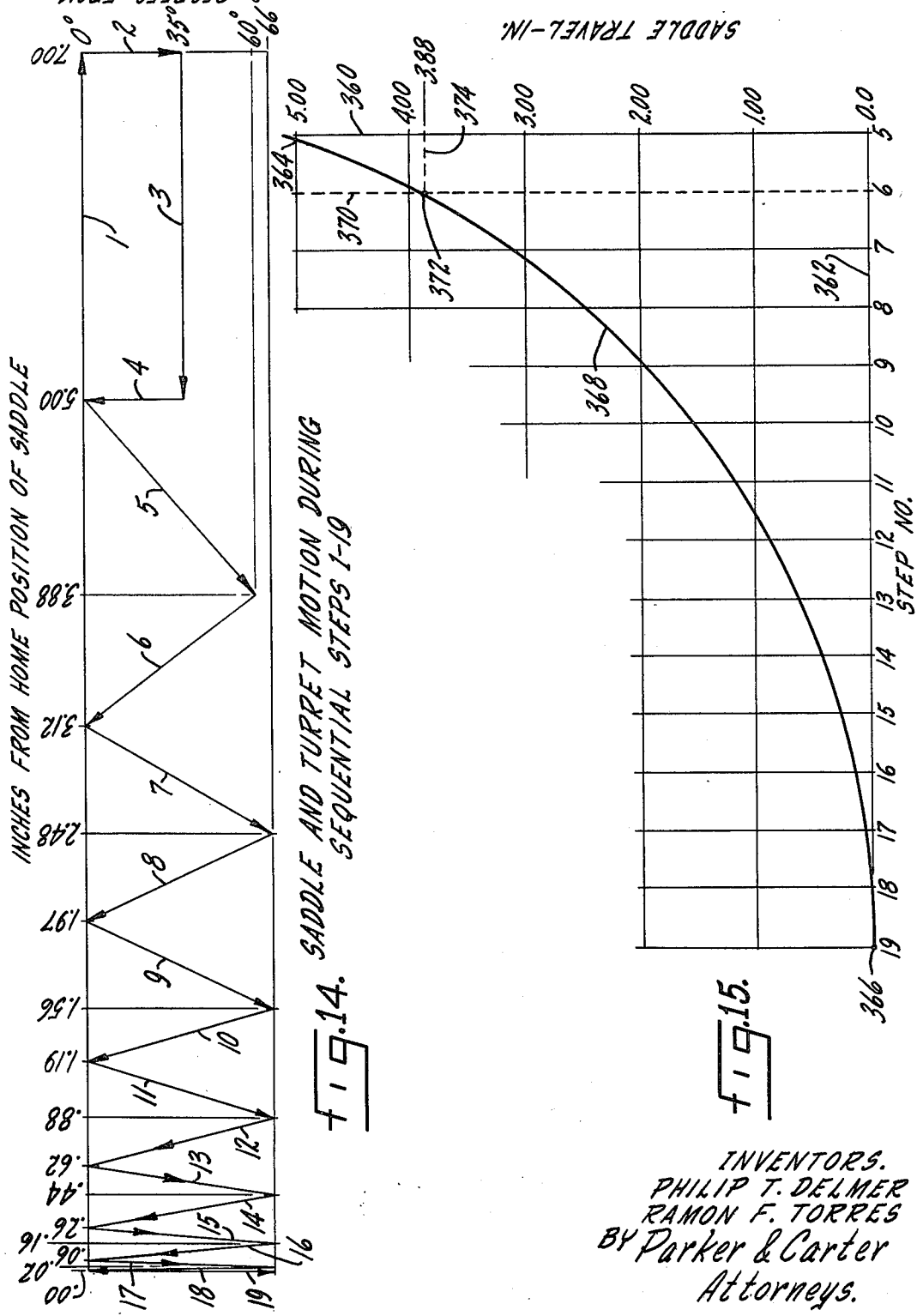

United States Patent Office 3,496,747
Patented Feb. 24, 1970

3,496,747
NUMERICALLY CONTROLLED SPINNING MACHINE
Philip T. Delmer, Milwaukee, and Ramon F. Torres, Rochester, Wis., assignors to Nordberg Manufacturing Company, Milwaukee, Wis., a corporation of Wisconsin
Filed Sept. 21, 1967, Ser. No. 669,541
Int. Cl. B21d 22/18
U.S. Cl. 72—81                     2 Claims

ABSTRACT OF THE DISCLOSURE

A method and apparatus for forming an end closure on the end of an axially rotating hollow cylindrical work piece using a forming surface adapted for engagement with the work piece by relatively moving the forming surface through a plurality of sequential cycles in which the forming surface is alternately rotated toward and away from the work piece rotational axis while being linearly moved along the work piece. The apparatus for automatically shaping the work piece includes a bed, a spindle mounted for rotation on the bed, a chuck jaw assembly carried by the spindle and adapted to grip the work piece for rotation with the spindle, a saddle slidably carried by the bed for linear movement in a direction parallel to the work piece rotational axis, a table slidably carried by the saddle for relative linear movement in a direction normal to the work piece rotational axis, a turret rotatably carried by the table, a forming wheel slidably mounted to the turret for linear movement in a direction toward the turret rotational axis, hydraulic actuators for moving the saddle, table, and turret, servo valves adapted to direct fluid pressure to the hydraulic actuators in response to electrical signals to thereby effect the desired movement of the forming wheel, tape means carrying the desired sequential saddle, table, and turret positional information, and circuit means responsive to the tape means and the actual position and the translational and rotational velocity of the saddle, table, and turret, respectively, for generating the electric signals for controlling the servo valves. A mechanism is provided to actuate the chuck jaw assembly.

SUMMARY OF THE INVENTION

This invention relates to a method and apparatus for forming a work piece, and more particularly, relates to a method for symmetrically forming the end of a hollow rotating cylinder and an apparatus adapted to automatically carry out such a forming method.

The forming of a closed or necked end on a hollow rotating cylinder by moving tool means through compound linear and arcuate motions has previously been accomplished by a manually skilled operator who manipulates turret and saddle controls in an attempt to rearrange the profile and stock of the unformed cylinder blank into the desired final geometry. Such previous devices and procedures are highly unsatisfactory in that reproducibility and production rates are very low and rejection or scrap rates are extremely high. For example, in forming the necked upper end of a high pressure gas bottle, for reasons of strength, it is necessary that the dome portion leading to the neck has a specific curvature and is of uniformly varying wall thickness. It is also necessary that the generally cylindrical neck portion has a specific wall thickness. Normally, in producing a high pressure gas bottle, the cylinder blank is formed by deep drawing a slug of material; and it is, therefore, very costly if this cylinder blank is later scrapped in attempting to form the necked upper end. Accordingly, it is extremely desirable to have a method and an apparatus whereby such cylinders may be formed consistently and accurately.

Therefore, a primary object of this invention is to provide a method for forming a symmetrical end closure on a rotating cylinder with a forming wheel.

Another object is to provide a method for forming a necked end on a rotating cylinder by repositioning the stock of the blank cylinder with combined rotational and linear movements of a forming wheel.

Another object is to provide a method for forming a closed end on a hollow blank cylinder which has a dome portion with a progressively increasing cross-sectional wall thickness terminating in a cylindrical neck having an increased wall thickness.

Another object is to provide an apparatus having tool means adapted for linear and rotational movement relative to a work piece and means for automatically controlling the movement of the tool means.

Another object is to provide an apparatus which has a table adapted for linear motion along a first axis, a saddle carried by the table for relative linear motion along a second axis, and a tool rotatably carried by the saddle for combined linear and rotational movement and means for automatically controlling the linear and rotational motion of the tool.

Another object is a spindle chuck jaw clamping mechanism for actuating a chuck jaw assembly that causes the chuck jaw assembly to grip the work piece with substantial force prior to rapid rotation of the spindle.

Another object is a chuck jaw clamping mechanism which will exert a generally uniform force in holding work parts having a wide range of diameters and which maintains the work piece tightly within the chuck jaws throughout the acceleration and deceleration of the spindle.

Another object is a chuck jaw clamping mechanism wherein the shifter rail pads or blocks float within the shifter rail and are not in frictional contact therewith when the spindle comes up to speed to thereby increase the useful life of the shifter blocks.

Another object is means for control of the advance and return of the forming roll relative to the work piece.

Another object is means for production of profile thickness variances along the arc of curvatures of open or flared shapes.

Another object is means for producing a constriction in the diameter of the hollow retaining cylinder and to otherwise form the profile of revolution to achieve specified shapes as for example, a venturi tube.

Another object is means for automatically controlling the turret position with the saddle held stationary in order to produce the wiping action on the contoured surface of the work piece which results in a desirable commercial finish.

Another object is means for pressure welding the end of a hollow cylinder closed.

Another object is to provide an apparatus for automatically forming a work piece in which dual axis, point to point and continuous pass forming motions between the tool means and the work piece can be effected by moving the tool means relative to the work piece in a single axis.

Another object is to provide an apparatus for automatically forming a work piece in which either the tool means or the work piece can be moved relative to the other through complex curvilinear forming motions such as a sine wave superimposed on a parabolic curve.

Another object is to provide an apparatus for automatically forming or shaping a work piece using forming or cutting tool means adapted for automatically controlled curvilinear single axis forming movement relative to the work piece.

Other objects and advantages of the invention will become apparent upon reading the following description of the invention.

BRIEF DESCRIPTION OF THE DRAWINGS

The invention is illustrated more or less diagrammatically in the accompanying drawings wherein:

FIGURE 7 is a partial cross-sectional view, with portions removed, of the spindle portion of the apparatus of FIGURE 1;

FIGURE 8 is an enlarged view of the chuck jaw actuating mechanism shown in FIGURE 7;

FIGURE 9 is a partial view of the chuck jaw actuating mechanism of FIGURE 8 in the open position;

FIGURES 13a and 13b show the sequential saddle and turret movements of one embodiment of the method of this invention;

FIGURE 14 is a vector diagram showing the sequential movement of the forming surface during Steps 1 through 19 of the method of FIGURES 13a and 13b; and FIGURE 15 is a graph used to determine the sequential saddle movements during the forming Steps 5 through 18 of the method of FIGURES 13a and 13b.

DESCRIPTION OF THE PREFERRED EMBODIMENT

Figure 1:
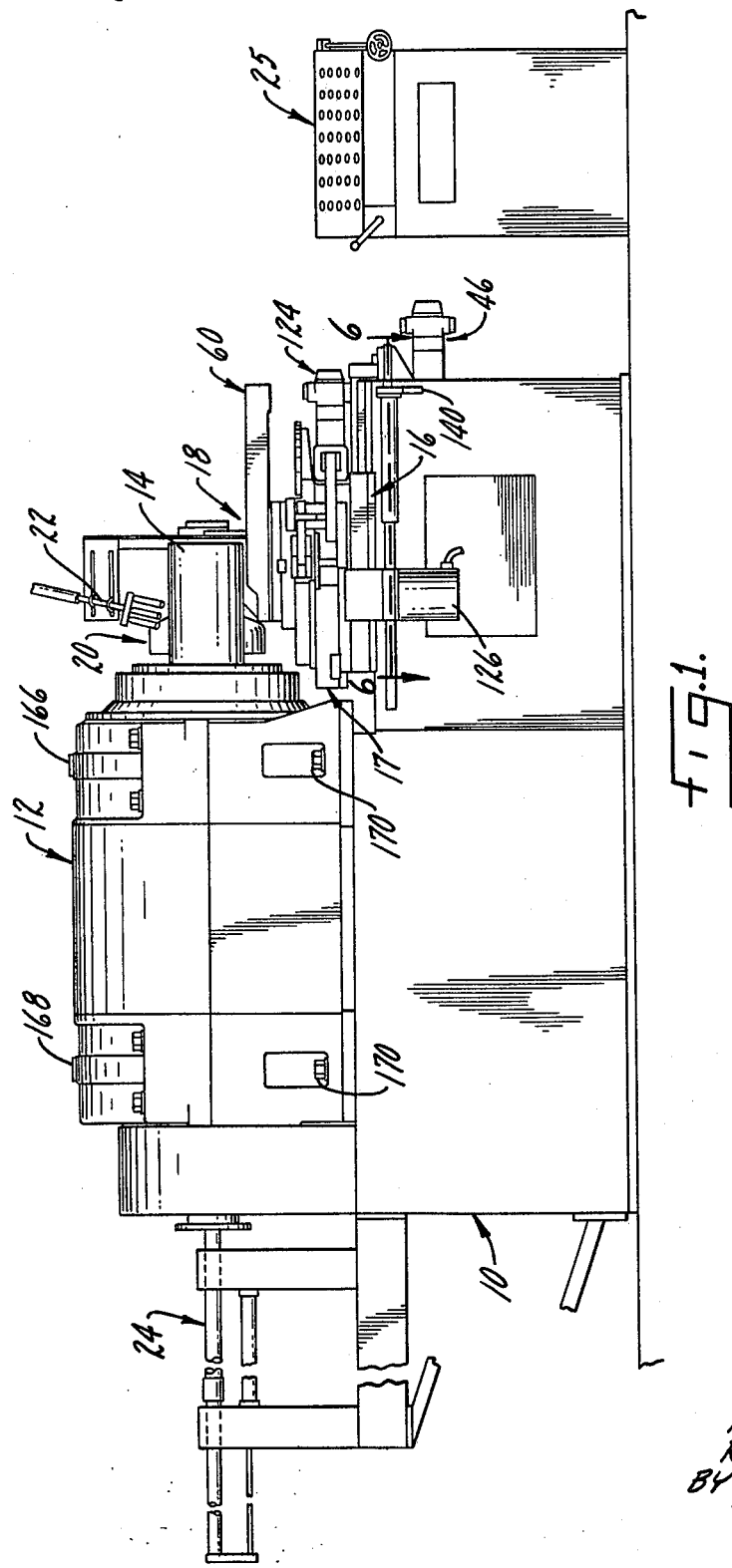
FIGURE 1 is a side elevational view of one embodiment of the apparatus of this invention.

Like reference numerals will be used to refer to like parts throughout the following description of the drawings.

Referring now to FIGURE 1, one embodiment of the automatic shaping device of this invention is shown as comprising a suitable supporting bed 10; a spindle 12 carried for rotation by the bed 10 and holding a hollow cylindrical workpiece 14; a saddle 16 adapted for linear motion along a first axis generally parallel to the workpiece 14; a table 17 carried by the saddle 16 for relative linear motion along a second axis normal to the saddle axis; and a rotatable turret 18 carried by the table 17 and having tool means 20 and a torch 22. A workpiece ejector mechanism is shown generally at 24 and a suitable console for use in operating the machine is indicated generally at 25.

Figure 2:
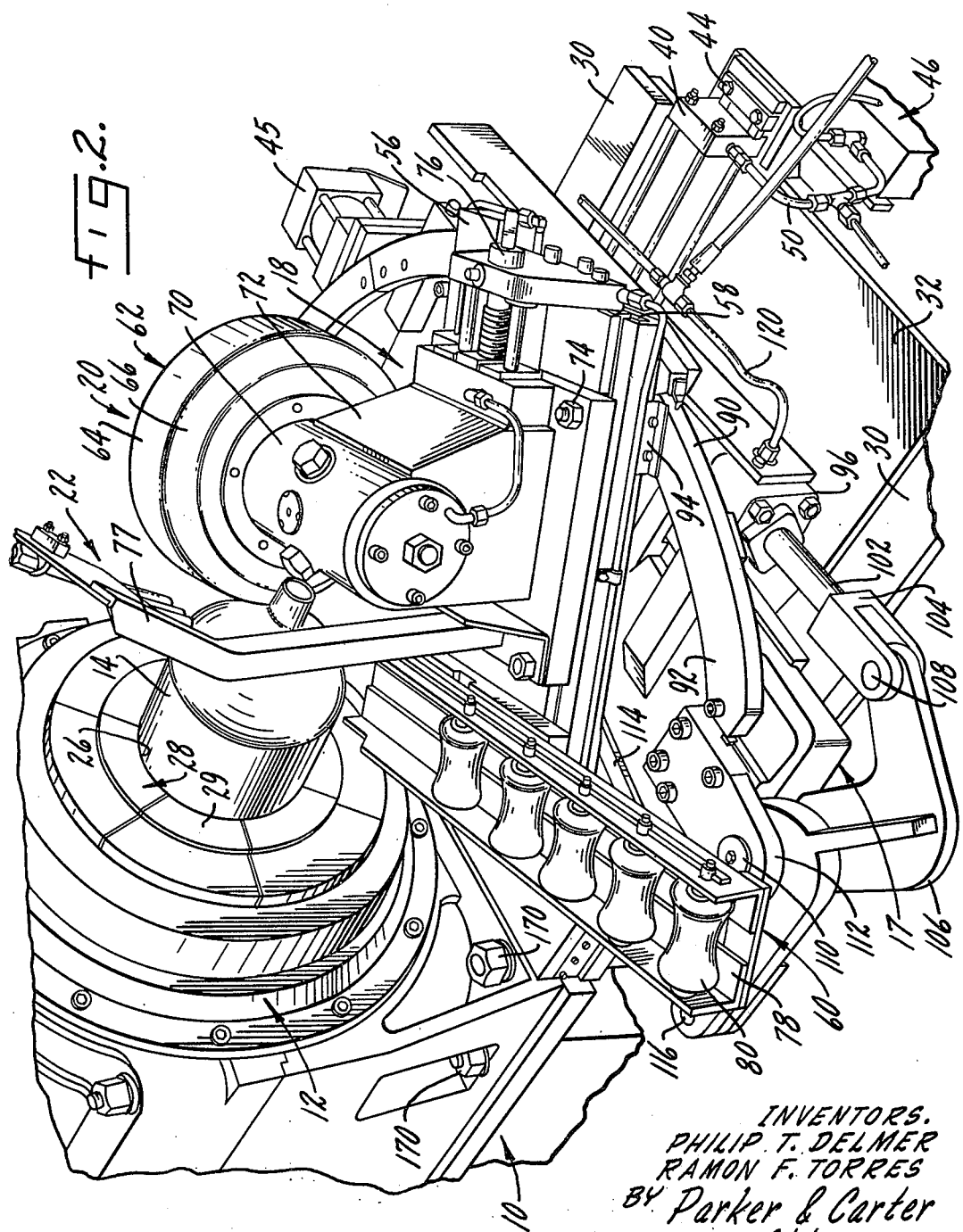
FIGURE 2 is a perspective view of the forming area of the apparatus of FIGURE 1.

Referring now to FIGURE 2, the workpiece 14 is shown extending from the forward face 29 of a spindle chuck jaw assembly 28. The bed 10, in the area forward of the chuck jaw face 29, is formed with two spaced parallel rails or ways 30 which define a channel 32 therebetween. The rails 30 are generally equally spaced about and parallel to the rotational axis of the spindle 12 and formed with a laterally extending flange portion 33.

Figure 4:
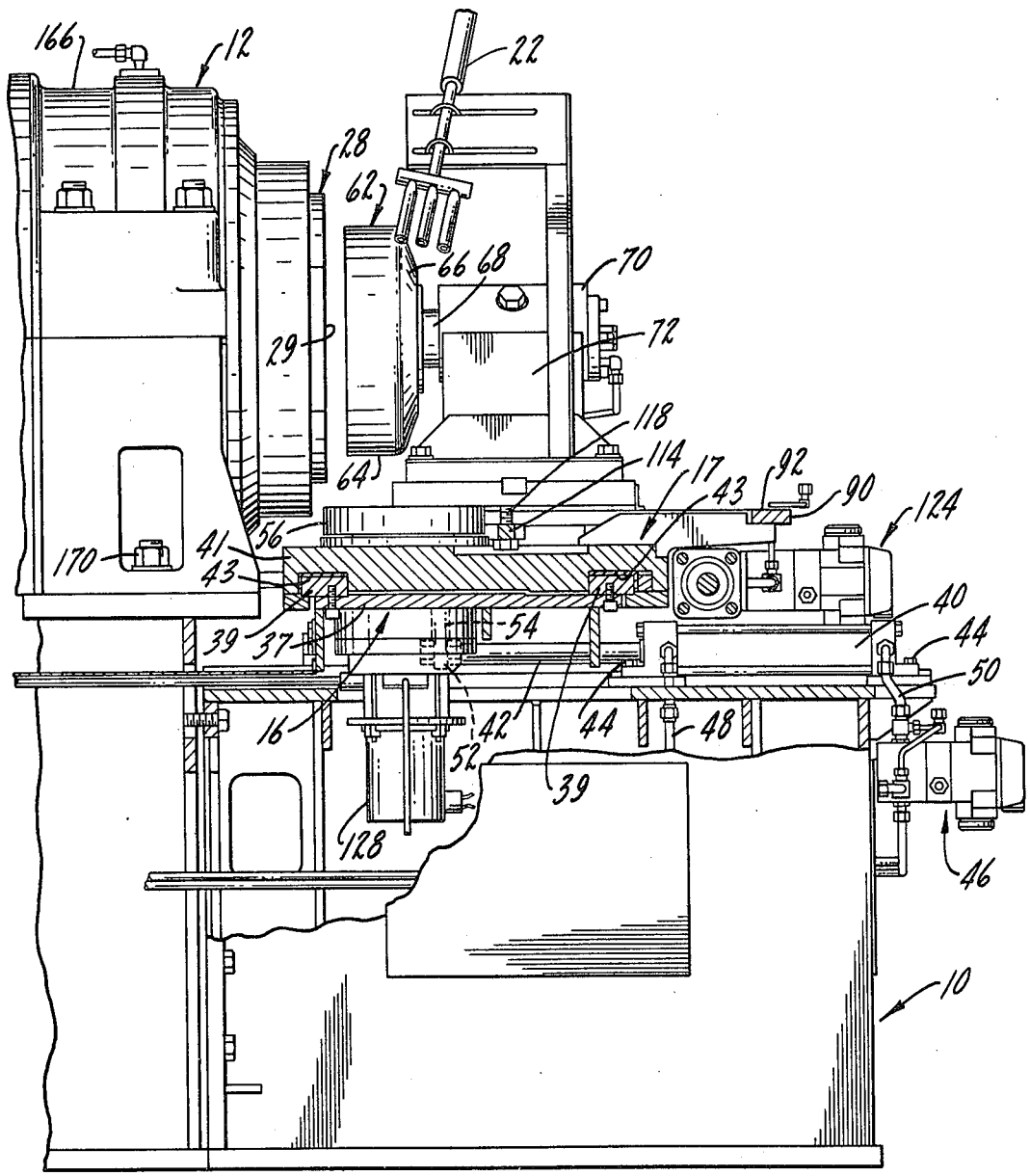
FIGURE 4 is a cross-sectional view taken along line 4—4 of FIGURE 3.
Figure 5:
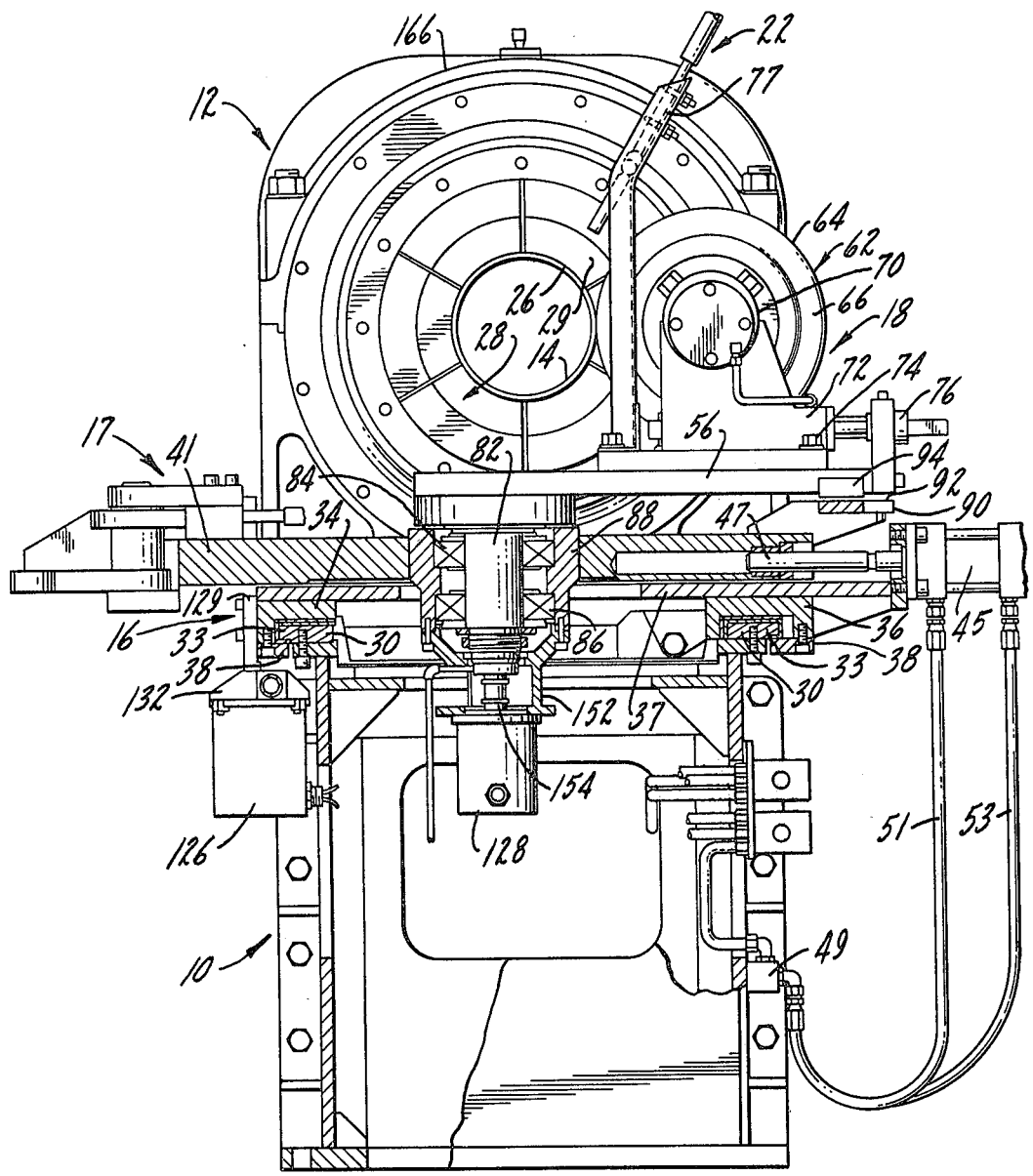
FIGURE 5 is a cross-sectional view taken along line 5—5 of FIGURE 3.

As best shown in FIGURES 4 and 5, the saddle 16 includes a plate member 37 having guide members 34 and 36 suitably secured to one side for engagement with the bed rails 30 and rails or ways 39 suitably secured to the other side. The saddle rails 39 extend transversely to the bed rails 30.

The guide member 34 is generally L-shaped in cross-section and is positioned over one bed rail 30. The guide member 36 is generally U-shaped in cross-section and is positioned over the other bed rail 30. A retaining plate 38 is suitably attached to each support member 34 and 36, in a position underlying the flanged portion 33 of the bed rails 30 to restrain saddle movement in all directions other than a direction parallel to the rotational axis of the spindle 12. Although a particular supporting structure for the saddle 16 has been depicted and described, it should be understood that any suitable structure which enables the saddle 16 to move linearly in a direction parallel to the rotational axis of the spindle 12 may be utilized.

As best shown in FIGURES 2 and 4, a hydraulic actuator 40 has an actuator rod 42 and is suitably attached to the bed 10 within the channel 32 by fasteners 44. The hydraulic actuator 40 is connected to a servo valve 46 by conduits 48 and 50. The servo valve 46, in turn, is connected to a source of fluid pressure, not shown, and is adapted to respond to an electrical input and deliver fluid pressure to the actuator 40 through conduit 48 and/or 50 to cause the actuator rod 42 to move axially into or out of the actuator 40. The actuator rod 42 may be connected to the plate member 37 of the saddle 16 by any suitable means. For example, the rod 42 may have a clevis 52 attached thereto at its outward end which engages a rod 54 depending from the saddle plate member 37.

The table 17 includes a plate member 41 formed with suitable guide channels 43 adapted to slidably engage the saddle rails 39 to enable relative movement of the table 17 with respect to the saddle 16 in a direction transverse to the rotational axis of the workpiece 14 and prohibit relative movement therebetween in all other directions. As shown in FIGURE 5, a hydraulic actuator 45 is suitably secured to the saddle plate 37 and has an actuator rod 47. The actuator rod 47 is suitably secured to the table plate 41. The hydraulic cylinder 43 is connected to a servo valve 49 by conduits 51 and 53. The servo valve 49, in turn, is connected to a source of fluid pressure, not shown, and is adapted to respond to an electrical input and deliver fluid pressure to the actuator 45 through conduits 51 and/or 53 to cause the table 17 to move linearly relative to the saddle 16 in a direction transverse to rotational axis of the spindle 12.

Referring again to FIGURE 2, the turret 18 is shown as comprising a base plate 56 having a plurality of T-shaped channels 58 formed therein. The base plate 56 supports the tool means 20, torch 22, and a suitable roller assembly 60. The tool means 20, in this instance, comprises a forming wheel 62 having an outer cylindrical forming surface 64 and a conical forming surface 66. The forming wheel 62 is carried by a shaft 68 which extends into and is supported for rotation by a suitable bearing assembly 70. The bearing assembly 70 is suitably attached to a support block 72 which is adjustably attached to the turret base plate 56 by fasteners 74. Each fastener 74 may have an enlarged head portion, not shown, which engages one of the T-shaped channels 58. Repositioning of the mounting block 72 on the base plate 56 may be facilitated by providing a suitable tool extension and retract mechanism as at 76, which may be hand operated, as with a threaded adjust member, or may be hydraulically operated.

Although a bearing assembly 70 has been shown, it should be understood that a motor adapted to rotatably drive the forming wheel 62 may be used. Further, a hydraulic actuator might be provided to enable movement of the forming wheel 62 linearly along its spin axis.

Although the tool means 20 have been depicted and described as comprising a forming wheel 62, it should be understood that a fixed or rotating cutting tool may be used instead.

The torch 22 may be provided to heat the workpiece 14 during the forming operation and may be mounted by a suitable bracket 77 to the mounting block 72 so that the torch will move with the forming wheel 62. The torch 22 is connected to a source of combustible gas and may be adapted to be lit by a workpiece 14 which has been preheated. A solenoid actuated valve, not shown, may be provided to control the flow of combustible gas to the torch 22. The solenoid valve actuating circuit may include a suitable temperature responsive switch, not shown, which will allow the solenoid valve to energize and open to allow flow of gas to the torch 22 only when the workpiece 14 is sufficiently hot to cause combustion of the gas.

The roller assembly 60 may be provided to aid in inserting and removing the workpiece 14 into and from the spindle 12 and may comprise an elongated channel member 78 having a plurality of rollers 80 rotatably mounted there along. The rollers 80 may have a curved rolling surface generally conforming to the outside diameter of the workpiece 14.

As best shown in FIGURE 5, the turret base plate 56 is suitably attached to one end of a shaft 82 which extends through and is rotatably supported by axially spaced bearings 84 and 86. The bearings 84 and 86 are suitably housed within a bearing sleeve 88 which is suitably mounted to the plate 41 of the table 17. The rotational axis of the shaft 82 and hence the rotational axis of the turret 18 is slightly displaced from the axis of the spindle bore 26.

The forming wheel mounting block 72 is positioned on the base plate 56 so that the circumferential forming surface 64 of the forming wheel 62 engages the outside cylindrical surface of the workpiece 14.

The table 17 may be provided with an arcuate rail or way 90 having a support surface 92. The turret base plate 56 may carry one or more bearing members 94 which are adapted to slidingly engage the support surface 92 of the rail 90 to support the turret 18 and reduce deflection in the shaft 82 and turret base plate 56 when the forming wheel 62 engages the workpiece 14.

Figure 3:
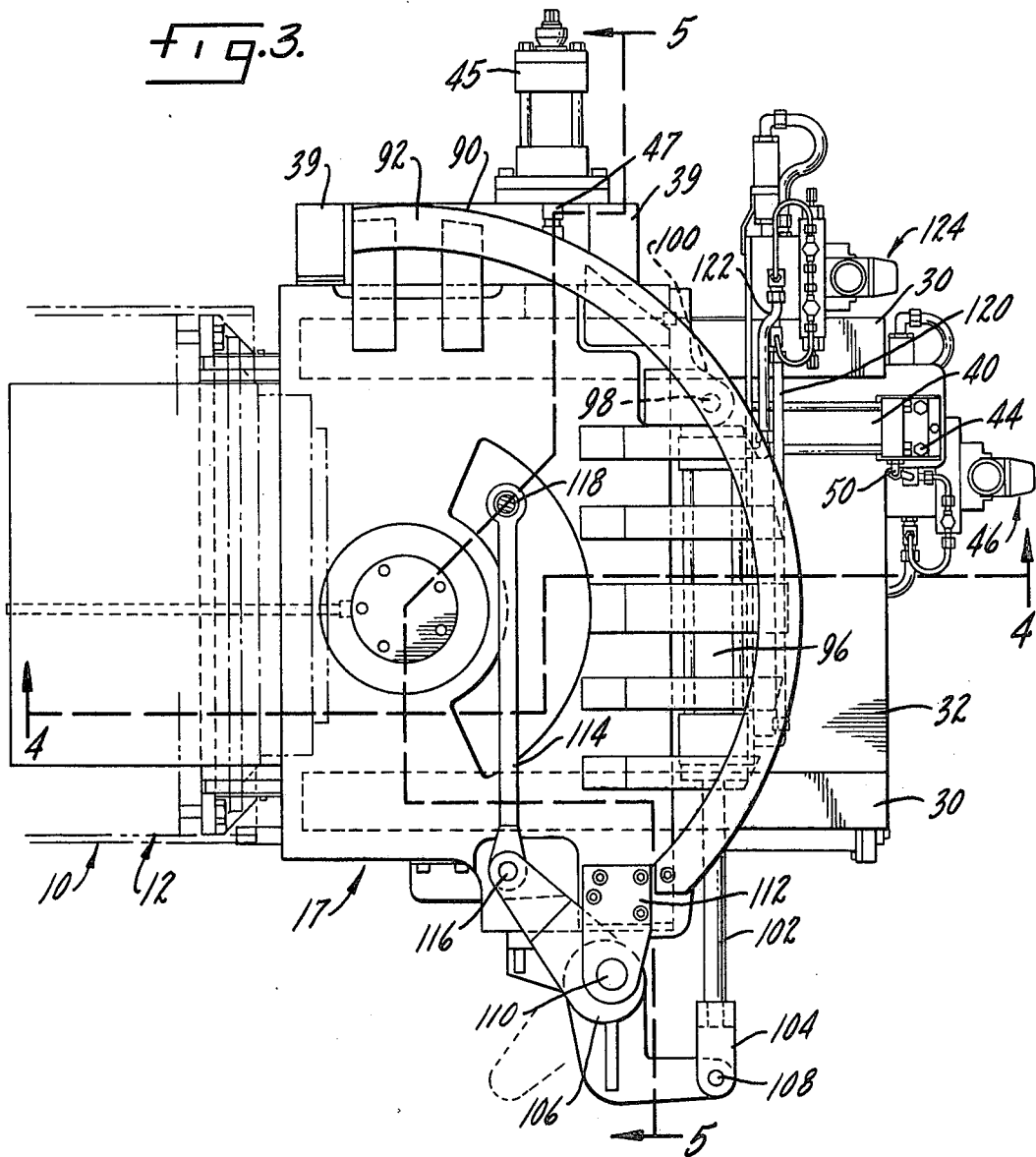
FIGURE 3 is a plan view of the forming area of the apparatus of FIGURE 1 with the turret removed.

Referring now to FIGURE 3, a hydraulic actuator 96 is shown pivotally attached at one end by a pin 98 to a lug 100 extending from the plate member 41 of the table 17. An actuator rod 102 having a clevis 104 attached to its outward end extends from the cylinder 96. The clevis 104 is pivotally attached to a generally L-shaped link 106 by a pivot pin 108. The link 106 is pivotally attached by a pivot pin 110 to a suitable bracket 112 extending from the upper plate 41 of the saddle 16. The link 106 is then connected to the turret base plate 56 by a rod 114 which is pivotally connected at one end to the link 106 by a pivot pin 116 and pivotally connected at its other end to the base plate 56 by a pivot pin 118. The connection between the rod 114 and the turret base plate 56 is made at a point radially spaced from the rotational axis of the turret shaft 82 so that as the actuator rod 102 is driven into and out of the hydraulic actuator 96 the turret 18 is rotated. The hydraulic actuator 96 is connected to a suitable servo valve 124 by conduits 120 and 122. The servo valve 124 is placed in communication with a source of fluid pressure, not shown, and is adapted to direct such pressure through conduit 120 and/or 122 in response to an electrical input to thereby rotate the turret 18 and the tool means 20.

Referring now to FIGURE 5, a feed back unit for sensing the linear position and longitudinal velocity of the saddle 16 along the bed rails 30 is shown at 126 and a like device for sensing the rotational position and rotational velocity of the turret 18 with respect to the saddle 16 is shown at 128. The saddle feed back unit 126 is suitably attached to the saddle for movement therewith by a bracket 129.

Figure 6:
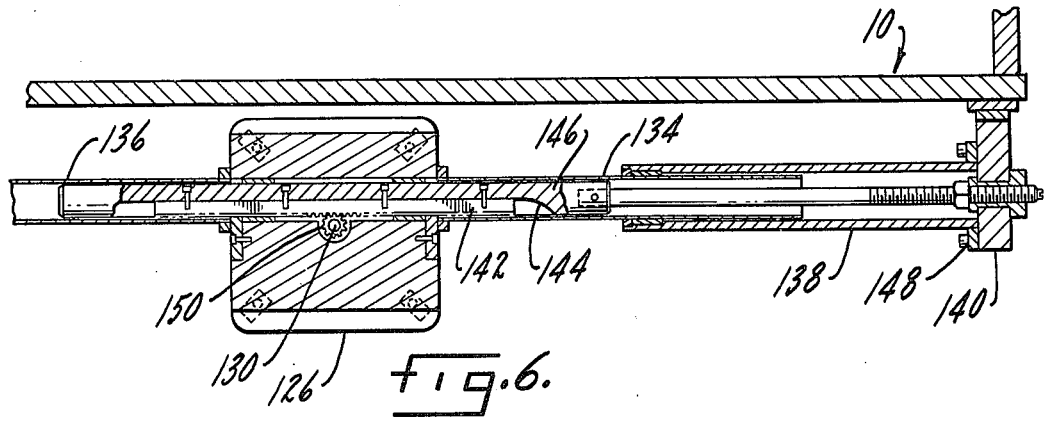
FIGURE 6 is a cross-sectional view to an enlarged scale taken along line 6—6 of FIGURE 1.

The feed back assembly 126 contains three syncros, a tachometer for speed regulation, and a torque motor to take up backlash in the feed back unit. Such feed back units are well known and, therefore, the details will not be described herein. Generally, however, each syncro is formed with a rotor which is suitably coupled to an input shaft 130 through a suitable gear train. In this instance, the coupling is such that one syncro rotor makes one revolution for every two revolutions of the shaft 130; a second syncro rotor makes one revolution for every five shaft 130 revolutions, and a third syncro rotor makes one revolution for every fifty shaft 130 revolutions. As best seen in FIGURES 5 and 6, the feed back unit 126 is formed with a cover member 132 which has tubes 134 and 136 extending oppositely therefrom. The tube 134 is open at both ends and is inserted within a tubular guide member 138 which is rigidly mounted to the bed 10 by a suitable bracket arrangement as at 140 in FIGURE 6. A rack 142 is suitably secured within a groove 144 formed in a rod 146. The rod 126 is suitably secured to the bed 10 as at 148. The feed back unit shaft 130 carries a pinion gear 150 which engages the rack 142. The pinion gear 150, in this instance, is sized so that the shaft 130 will make two revolutions for every inch of saddle movement.

The rotary feed back unit 128 contains a syncro and a tachometer for speed regulation. As with the feed back unit 126, such devices are well known and will not, therefore, be described in detail. As best shown in FIGURE 5, the feed back unit 128 is suitably connected to the turret bearing mounting sleeve 88 by a suitable housing 152. An output shaft of the feed back unit 128 is suitably coupled to the turret shaft 82, for rotation therewith, as at 154 in FIGURE 5. In this instance, the syncro rotor is coupled to the shaft 82 so that it makes one revolution for every revolution of the shaft 82.

Although a feed back unit for the table 17 has not been depicted or described, it will be understood that one may be provided.

Referring now to FIGURE 7, the spindle 12 is shown as comprising an elongated cylindrical tube 160 rotatably supported by axially spaced bearings 162 and 164 which are mounted to the base 10 by suitable headstocks 166 and 168 respectively. The headstocks 166 and 168 are secured to the bed 10 by suitable fasteners 170 as shown in FIGURES 1 and 2. A cam ring 172 having a conical inner surface 174 is attached to the forward end of the cylindrical tube 160 by suitable fasteners 176.

The segmented, generally cylindrical chuck jaw assembly 28 is formed with a conical outer peripheral surface 180 adapted to slidingly engage surface 174 of the cam ring 172 and a cylindrical tail portion 182 having an internal circular groove 184. The chuck jaw assembly 28 comprises a plurality of segments 186. Each segment may carry an extension member 188 having a generally cylindrical inner surface 190 which grippingly engages the cylindrical work piece 14 for rotation with the spindle 12. The chuck jaw assembly 28 may be connected for rotation with the spindle 12 by a key 192 which extends into the cam ring 172.

A hollow cylindrical sleeve 194, having a first pair of axially spaced radial flanges 196 and 198 adjacent one end and a second pair of spaced radial flanges 200 and 202 adjacent the other end, is slidably supported within the spindle tube 160 by the outer circumferential surfaces of the flanges 196, 198, and 200. The flange 202 is adapted to engage the circular groove 184 of the chuck jaw assembly 28. The flanges 196 and 198 form a radially opening groove 204 which is positioned generally in line with diametrically opposed apertures 206 formed through the wall of the spindle tube 160. A generally L-shaped link 208 is pivotally attached to a support block 212 by a pivot pin 214, adjacent each tube aperture 206. Each L-shaped link has a finger portion 216 which extends radially inwardly through its respective aperture 206 and into engagement with the radially opening groove 204 of the sleeve 194. The other leg of each L-shaped link 208 extends generally axially and rearwardly with respect to the chuck jaw surface 29 and forms a counterweight portion 218. Each mounting block 212 is suitably secured to the spindle tube 160 and may be formed with an aperture 220 through which the link 208 extends.

A cylindrical shifter ring 222 is mounted for sliding axial movement on the outer surface of the spindle tube 160 and has at one end a pair of axially spaced radially extending flanges 224 and 226 which form a radially opening groove 228 therebetween having a bottom surface 229. The flange 226 is formed with an axially extending circumferential lip 230 which is adapted to extend within an arcuate groove 232 formed in the end of each L-shaped link counterweight portion 218.

Each L-shaped link 208 is coupled to the shifter ring 222 by a rod 234 having an enlarged head portion 236. Each rod 234 extends through a pivot pin 238 carried by its respective L-shaped link 208 and is retained by the enlarged head portion 236. The lower end of each rod 234 is pivotally attached to the forward end of the shifter ring 222. Each rod 234 carrries spring means 240 which engage the pivot pin 238 to urge the counterweight portion 218 of the L-shaped link 208 to rotate radially outwardly and the finger portion 216 to move axially rearwardly with respect to chuck jaw surface 29. The spring means 240 may comprise a plurality of spring washers having a truncated conical cross-section and commonly known as Belleville springs.

Figure 10:
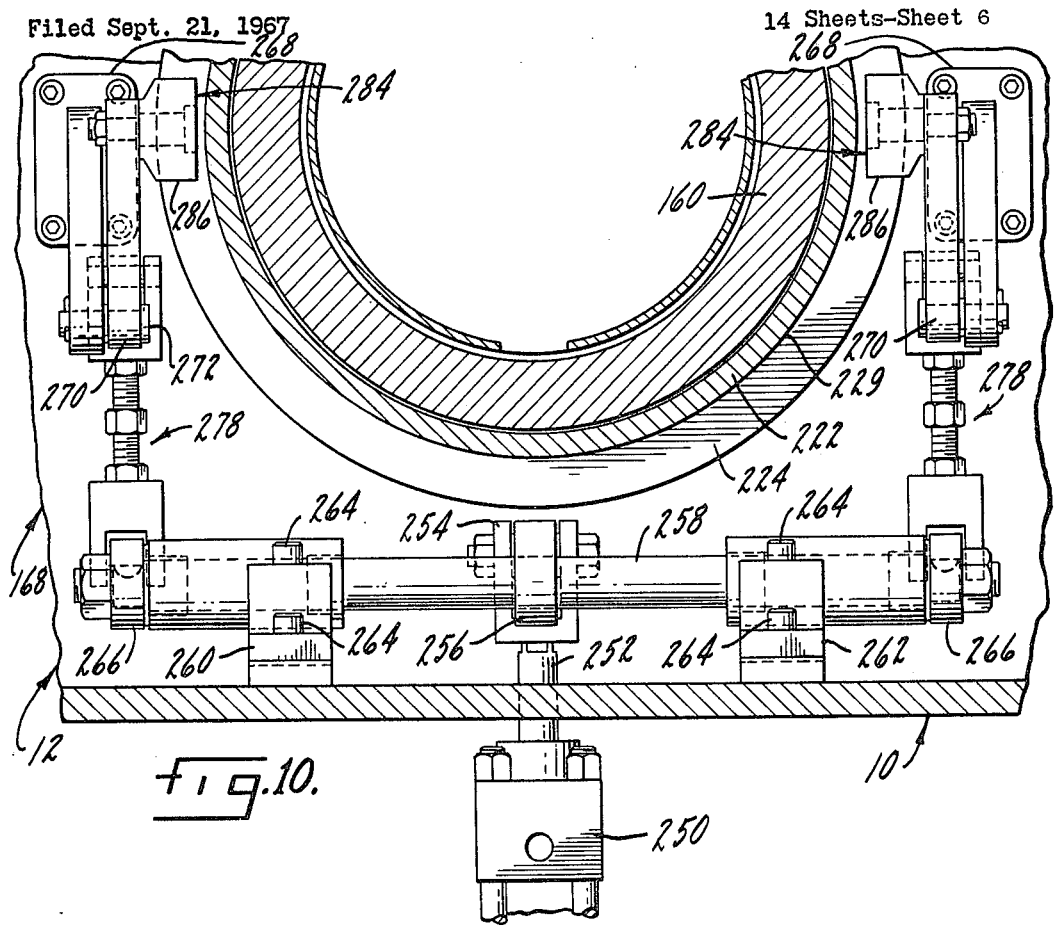
FIGURE 10 is a partial front elevational view of the chuck jaw actuating mechanism taken along line 10—10 of FIGURE 8.

Referring now to FIGURES 8, 9, and 10, a hydraulic actuator is shown at 250. An actuator rod 252 extends from the actuator 250 and has a clevis 254 at its outermost end. The clevis 254 is pivotally attached to a crank arm 256 which extends radially from a shaft 258. The shaft 258 extends laterally beneath the spindle 12 and is rotatably supported by pivot blocks 260 and 262 on each side of the crank arm 256. The pivot blocks 260 and 262 are suitably mounted to the base 10 as by fasteners 264. The shaft 258 is formed with a radially extending crank arm 266 adjacent each end. A bracket 268 is suitably attached on each side of the spindle 12 to the front face of the rear headstock 168. An L-shaped link 270 is pivotally attached at its apex to each bracket 268 as at 272. Each L-shaped link has a generally rearwardly extending leg 274 and a generally vertically extending leg 276. Each rearwardly extending leg 274 is pivotally connected to one of the crank arms 266 by an adjustable link 278.

The generally vertically extending leg 276 of each L-shaped link 270 is pivotally attached to a shifter pad or shoe 284 having a generally rectangular portion 286 which extends within the radially opening groove 228 of the shifter ring 222.

As shown in FIGURE 10, the shoes 286 are generally diametrically opposed and are spaced from the circumferential surface 229 of the shifter ring 222. As best shown in FIGURES 8 and 9, each shoe 284 is slightly undersized relative to the axial width of the groove 228 so that it may ride in clearance with the groove forming surfaces of radial flanges 224 and 226 when the spindle comes up to speed as will be hereinafter described.

The chuck jaw clamping mechanism is shown in its clamping position in FIGURE 8. In clamping the workpiece 14 within the chuck jaw assembly 28, the actuator rod 252 is driven generally vertically, as viewed in FIGURE 8; such vertical movement causes the shaft 258 and L-shaped links 270 to rotate such that the shoes 284 are moved forward into engagement with the flange 226 to cause the shifter ring 222 to slide axially along the spindle tube 160 toward the chuck jaw surface 29. When the shifter ring 222 is so moved, the counterweight portion 218 and the finger portion 216 of each L-shaped link 208 are respectively yieldingly urged radially outwardly and axially away from the chuck jaw surface 29 by the yielding means 240. The movement of the finger portions 216 of the links 208 is followed by the sleeve 194 and hence by the chuck jaw assembly 28. As the chuck jaw assembly 28 is moved rearwardly, the gripping surface 190 is closed into gripping engagement with the workpiece 14 by the camming action of cam ring surface 174 and chuck jaw surface 180.

When the spindle is brought up to speed, centrifugal force acts to urge the counterweight portions 218 of the L-shaped links 208 radially outwardly which, in turn, urges the chuck jaw assembly 28 into tighter gripping engagement with the workpiece 14. Such slight centrifugal force actuated movement of the links 208 causes the shifter ring 222 through rod 234 to be pulled forward to a new position, as generally indicated by the phantom lines in FIGURE 8. Means may be provided to maintain the actuator rod 250 and, hence, the shoes 284, stationary as the spindle is brought up to speed. Accordingly, as the spindle is brought up to speed, the movement of the shifter ring 222 increases the gripping force exerted by the chuck jaw assembly on the workpiece 14 and the shifter ring radial flange 226 moves out of contact with the shoes 284 so that the shoes 284 float within the groove 228, thereby increasing the useful life of the shoes.

The means for maintaining the shoes 284 stationary as the spindle is brought up to speed may be a mechanical stop, not shown, adapted to engage one of the actuating linkage members to prohibit movement of the shoes 284 beyond a predetermined position; or, a limit switch adapted to be actuated when the shoes 284 reach a predetermined position to open or close an electrical circuit which thereby effects an equalization of fluid forces acting on the actuator rod 252 within the actuator 250; or, a switch suitably coupled to the spindle and of the type adapted to open or close an electrical circuit at a predetermined r.p.m. which thereby effects an equalization of the fluid forces acting on the actuator rod 252; or other like suitable means.

When the shifter ring 222 slides forward on the spindle tube 160, as above described, the lip 230 of flange 226 moves within the arcuate groove 232 formed in the counterweight portion 218 of the L-shaped link 208.

The chuck jaw clamping mechanism is shown in the unclamped position in FIGURE 9. To unclamp the workpiece 14, the piston rod 252 is withdrawn into the cylinder 250 causing the shoe 284 to move generally rearwardly into engagement with the shifter ring 224. This rearward movement of the shifter ring 222 is translated into a forward movement of the chuck jaw assembly 28 through rods 234, links 208, and sleeve 194.

The spindle 12 may be rotatably driven using any suitable means. For example, as shown in FIGURE 7, a sheave 290 may be mounted to the spindle tube 160 by a sleeve key 292. Suitable belts may be looped around the sheave 290 and a suitable motor-driven sheave, not shown, to impart rotary motion to the spindle.

The ejector mechanism 24 generally comprises an actuating rod 294 which extends into the spindle tube 160 and terminates in an enlarged head portion 296 which is adapted to position the workpiece within the spindle 12 by engagement therewith. The ejector mechanism 24 is adapted to eject the finished workpiece 14 from the spindle after it has been formed.

Figure 11:
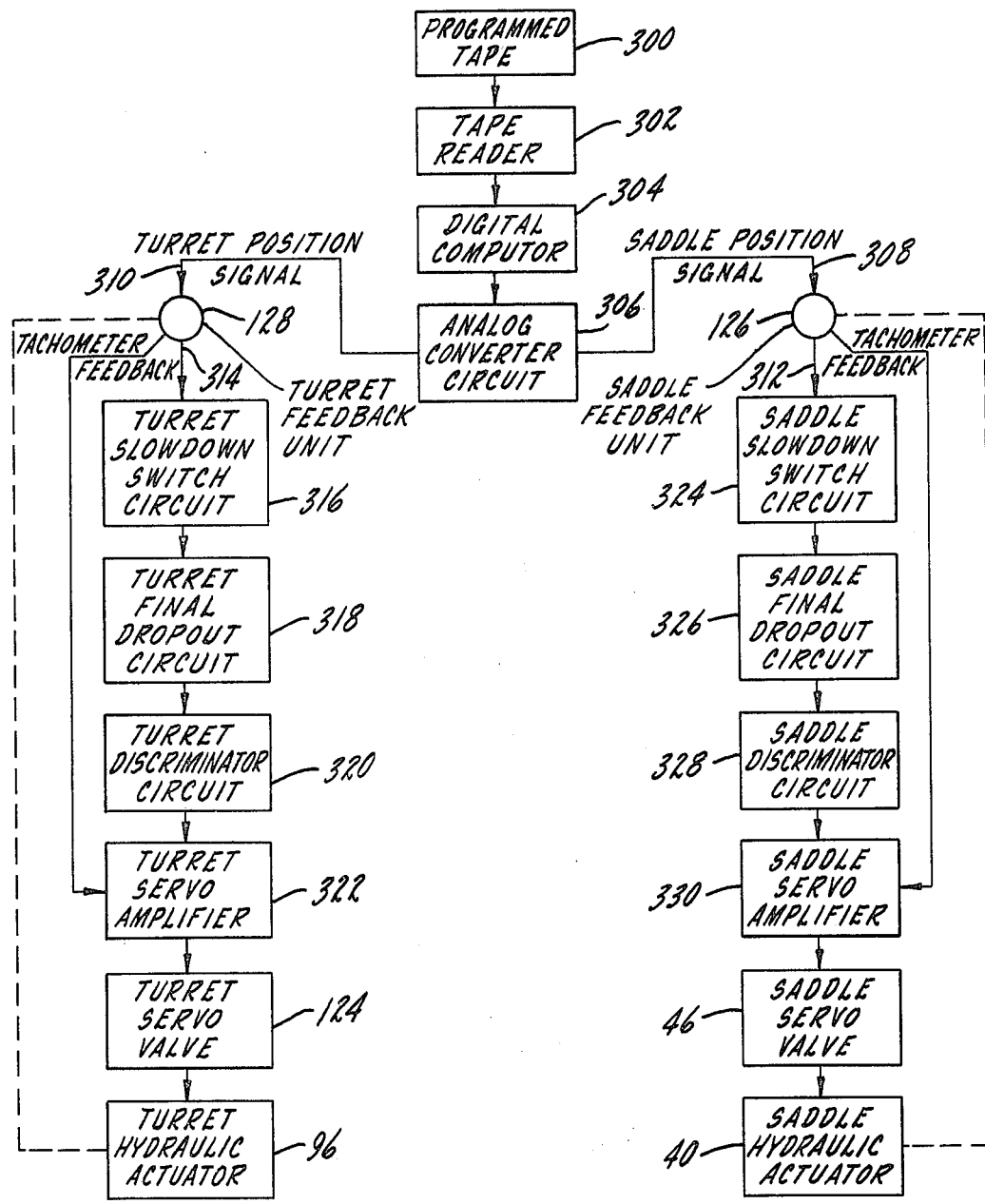
FIGURE 11 is a block diagram showing one embodiment of the automatic control means for the apparatus of FIGURE 1.

Means for automatically controlling the saddle and turret servo valves 46 and 124 to thereby automatically control the linear and arcuate movement of the forming wheel 62 have been shown in block diagram form in FIGURE 11. Although not shown, it will be understood that like control means may be provided for the table servo valve 49. A program tape 300 having the sequential saddle 16 and turret 18 positional information programmed thereon is inserted into a suitable tape reader 302 which decodes the tape 300 and forwards the information thereon to a digital computer 304. The digital computer then sequentially delivers saddle and turret positional information to an analogue converter circuit 306. The analogue converter circuit 306 converts the digital saddle and turret position signals delivered to it from the computer 304 to AC signals having voltage magnitudes proportionate to the distance between the position the saddle and turret are to proceed and a zero reference or home position. A saddle position signal 308 and turret position signal 310 are respectively delivered to the syncros in the saddle feed back unit 126 and the syncro in the turret feed back unit 128.

The saddle and turret feed back units 126 and 128 generate a position difference signal 312 and 314, respectively, which has a voltage magnitude proportionate to the distance between the actual saddle or turret position and the programmed position. The actual position of the saddle or turret relative to the home position is determined by the rotary position of the syncro rotors. As previously indicated, the saddle feed back unit 126 contains three syncros; namely, a fine syncro, a medium syncro, and a coarse syncro. Accordingly, position difference signal 312 contains three signals. However, as will be understood, only one such signal controls at any one time.

The turret position difference signal 314 is sequentially fed into a turret slowdown switch circuit 316 and a turret final dropout circuit 318. An AC signal is sent to a turret discriminator circuit 320 from the final dropout circuit 318. The discriminator circuit 320 converts the AC signal delivered by the dropout circuit 318 to a plus or minus DC signal output depending upon the input signal phase. The sign of the discriminator output determines the direction of turret rotation. The slowdown switch circuit 316 and final dropout circuit 318 cause the discriminator output signal to be reduced in magnitude as the turret aproaches its final or programmed position to effect slowdown of turret movement as it approaches the programmed position to thereby promote smooth and accurate positioning. The output signal of the turret discriminator circuit 320 is sent to the turret servo amplifier 322 which may also receive a signal from the tachometer in the turret feed back unit 128 for speed regulation purposes. The turret servo valve 124 is controlled by the output signal of the servo amplifier 322 and, as previously discussed, controls the flow of pressure to the hydraulic actuator 96 to thereby rotate the turret 18 to the programmed position.

The saddle position difference signal 312, like the turret position difference signal 314, is sent to a slowdown switch circuit 324, a final dropout circuit 326, a saddle discriminator circuit 328 and the servo amplifier 330. The saddle control circuit functions are the same as those previously described for the turrent control circuit except that the discriminator circuit 328 performs the additional function of determining which one of the three syncros within the saddle feed back unit 126 will control. The output of the servo amplifier 330 drives the saddle servo valve 46 which, as previously indicated, controls the delivery of fluid pressure to the saddle hydraulic actuator 40 to thereby cause the saddle to move toward or away from the spindle 12 to the programmed position.

Although the apparatus has been depicted and described as being numerically or tape controlled it will be understood by those skilled in the art that cam control or tracer control may be employed.

Figure 12:
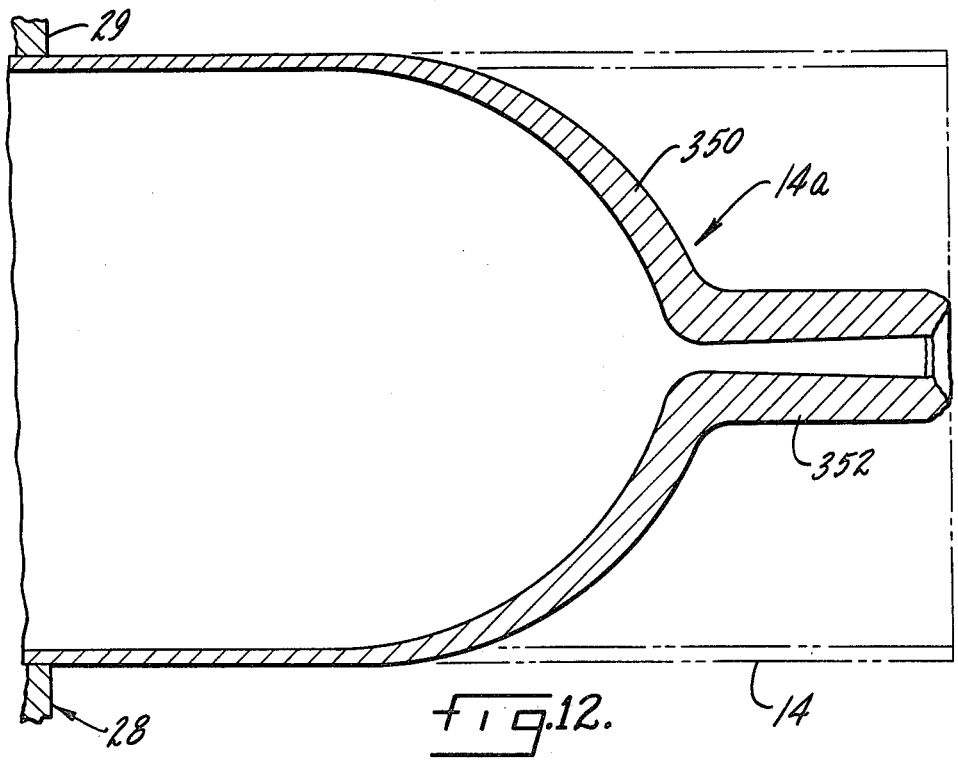
FIGURE 12 is a cross-sectional view of the preferred end closure formed by the apparatus and method of this invention.

Referring now to FIGURE 12, the unformed hollow cylindrical workpiece is shown at 14 extending from the spindle chuck jaw assembly 28. The formed end of the cylindrical workpiece is shown generally at 14a as having a dome-like portion 350 which blends into a generally cylindrical neck portion 352. The dome portion 350 has an ever-increasing wall thickness as it approaches the neck 352 and the axial neck portion 352 has a generally uniform thickened cross-sectional wall thickness.

The above described end closure is typical of the type preferred for high pressure gas bottles. It should be understood, however, that the end closure 14a may take on a variety of shapes depending upon the application. For example, the amount of thickening in the dome portion 350 may be varied, the arc of the dome portion 350 may be varied, and the outside diameter, length, and wall thickness of the cylindrical neck portion 350 may be varied. Further, the dome portion 350 may be completely closed and the neck portion 352 may be eliminated.

Figure 13B:
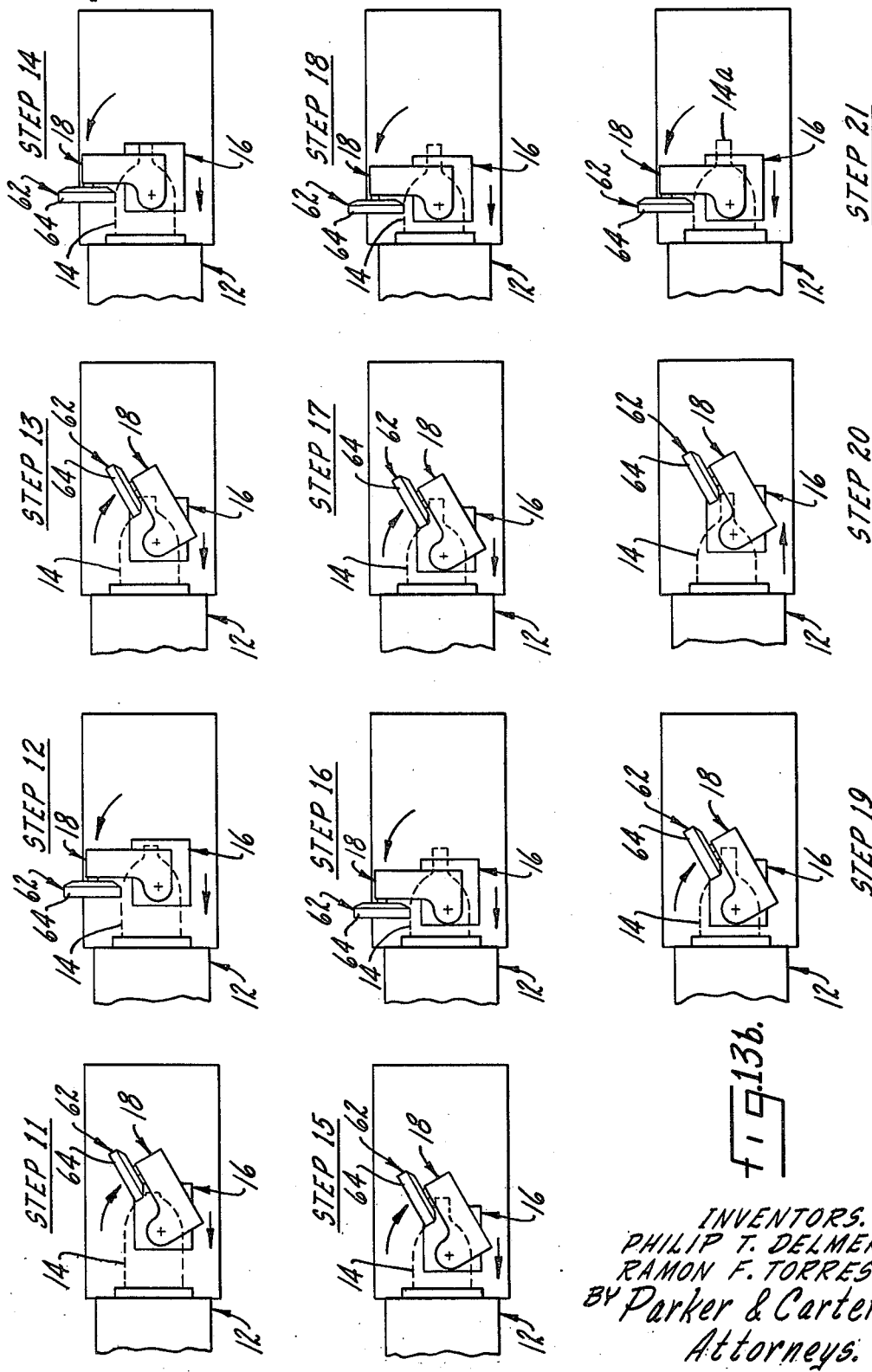

Referring now to FIGURES 13a and 13b, the method of forming the end closure 14a of FIGURE 12 using the apparatus of FIGURE 1 has been shown along with the general configuration of the end closure at the end of each step.

The Start Position shows the saddle 16 and turret 18 in their initial reference or home positions relative to the unformed workpiece 14 and spindle 12. Steps 1 through 4 are preliminary bending steps in which the form wheel 62 is moved in simple motion; that is, there is either linear motion of the saddle or rotational movement of the turret during each step.

Steps 5 through 18 are the forming steps. In each of the Steps 5 through 18, the saddle 16 and the turret 18 are simultaneously moved to form the desired end closure. In Steps 19 and 20, the turret and saddle are shown being moved through simple motions to smooth the outer surface of the dome portion 350 and neck portion 352. In Step 21 the turret and saddle are shown returned to their respective initial reference or home positions.

At the conclusion of Step 21, pressurized fluid is directed to hydraulic actuator 45 to cause the forming wheel 62 to be moved from its FIGURE 5 position to a position spaced from the finished workpiece, the finished workpiece is ejected from the spindle 12, a new unformed workpiece 14 is inserted into the spindle 12, the form wheel is then returned to its FIGURE 5 position by the hydraulic actuator 45 and the method is repeated.

The following table, labeled Table 1, indicates the saddle and turret motion which occurs during each step. Minus signs indicate saddle movement away from the initial reference or home position in a direction away from the spindle 12 and turret movement toward the workpiece axis. Plus signs indicate movements toward the initial reference or home positions.

TABLE 1

| Step No. | Saddle Motion in Inches | Turret Motion in Degrees |
|---|---|---|
| 1 | −7.00 | 0 |
| 2 | 0.00 | −35 |
| 3 | +2.00 | 0 |
| 4 | 0.00 | +35 |
| 5 | +1.12 | −60 |
| 6 | +0.76 | +60 |
| 7 | +0.64 | −66 |
| 8 | +0.51 | +66 |
| 9 | +0.41 | −66 |
| 10 | +0.37 | +66 |
| 11 | +0.31 | −66 |
| 12 | +0.26 | +66 |
| 13 | +0.18 | −66 |
| 14 | +0.18 | +66 |
| 15 | +0.10 | −66 |
| 16 | +0.10 | +66 |
| 17 | +0.04 | −66 |
| 18 | +0.02 | +66 |
| 19 | 0.00 | −66 |
| 20 | −3.00 | 0 |
| 21 | +3.00 | +66 |

The Steps 1 through 19 inclusive have been shown in graphic or vector form in FIGURE 14 wherein the horizontal axis indicates movements of the saddle 16 and the vertical axis indicates rotation of the turret 18. The inclined vectors, indicating Steps 5 through 18, show the compound rotational and linear motion of the forming wheel 62.

As is apparent from Table 1 and FIGURE 14, the forming Steps 5 through 18 may be characterized as forming a plurality of two step cycles in which the saddle is first moved linearly toward its home position while the turret is simultaneously rotated away from its home position toward the workpiece axis. Each such cycle is then completed by simultaneously moving the saddle linearly toward its home position and rotating the turret away from the workpiece axis to its home position. Although seven such forming tool cycles have been shown, it should be understood that the number may be varied widely. Further, although specific saddle and turret movements have been listed, such distances and rotational arcs may be varied and the forming wheel 62 may remain stationary and the workpiece 14 moved. What is important is that: (1) the relative linear movement between the workpiece 14 and the forming tool 62 during each corresponding step of each successive cycle be less than the relative linear movement during the preceding cycle; (2) the relative linear movement during each step is less than or equal to the relative linear movement during the preceding step; and (3) the relative rotational movement during each step is greater than or equal to the relative rotational movement during each preceding step.

The method by which the saddle movements during Steps 5 through 18 were determined has been shown in FIGURE 15. A vertical axis 360 and an intersecting horizontal axis 362 are constructed. Point 364 indicates the distance the saddle is from its home position at the start of the first forming step or Step 5. The vertical axis 360 indicates the distance between the saddle home position and the saddle position at the start of any forming step. The horizontal axis 362 indicates the forming steps through which the forming wheel 62 will be moved in arriving at the finished end closure for the cylindrical workpiece 14. The end of the last such forming step, in this instance Step 18, is indicated at 366. A circular line 368 is constructed which is tangent to the horizontal axis 362 at 366 and which intersects the vertical axis 360 generally at point 364. The distance of the saddle from its home position at the start of each successive forming step and, therefore, the distance through which the saddle should be moved during each forming step is then determined by the line 368. For example, to determine the saddle position at the start of Step 6 or the distance the saddle is to be moved in Step 5, vertical line 370 is constructed which intersects line 368 at 372. A horizontal line 374 is then constructed through point 372 to the vertical axis 360 which indicates the new saddle position should be 3.88 inches away from its home position at the start of Step 6.

It should be noted that the rotational center line of the turret 18 and, hence, of the tool means 20 moves with the table 17 and the saddle 16. Thus, by simultaneously moving the saddle 16 and rotating the turret 18 about its moving rotational center line, the equivalent of dual axis, point to point and continuous pass tool means forming motions can be effected although the tool means is moved along only one axis. Accordingly, the apparatus of this invention can automatically effect dual axis, point to point and continuous pass forming motions between the tool means 20 and the workpiece 14 although the tool means is moved relative to the workpiece along only a single axis.

It should further be noted that the table 17 may be moved in a direction transverse to the direction of motion of the saddle 16. It being understood that automatic control means for controlling the movement of the table 17 may be provided like that depicted and described for the saddle 16, by moving the saddle relative to the bed, the table relative to the saddle and by rotating the turret, complex curvilinear forming motions between the tool means and the workpiece, such as a parabolic curve having a sine wave superimposed thereon or the like, may be automatically produced.

Although a preferred embodiment of the invention has been depicted and described, it should be understood that many additions, alterations, and variations may be made without departing from the invention's fundamental theme. For example, although the apparatus of this invention has been depicted and described as having a forming wheel which is adapted for simple and compound linear and arcuate movement with a respect to a rotating workpiece, it should be understood that the forming tool may be stationary and the workpiece may be moved instead, or the forming tool may be rotated while the workpiece is advanced toward the forming wheel. For example, the tool means may be carried by the spindle and the workpiece carried by the turret. Further, although the apparatus is particularly adapted for forming a workpiece by moving and repositioning the material in the workpiece, it should be understood that the forming wheel could be replaced by a cutting tool and that forming or shaping could be effected by removal of material rather than by repositioning the material.

Accordingly, the scope of the invention should be limited only by the scope of the following appended claims.

What is claimed is:

1. An apparatus for automatically shaping a workpiece, including, in combination, a bed, a saddle adapted for linear motion along said bed, a turret structure carried for movement with said saddle and adapted to rotate about a generally vertical axis which is movable with said saddle, a spindle structure carried by said bed and adapted for rotation about an axis generally parallel to the direction of movement of said saddle, tool means for engaging and forming said workpiece carried by one of said structures with said workpiece carried by the other of said structures, means for automatically controlling the movement of said turret and said saddle to thereby shape said workpiece, a chuck jaw assembly carried for rotation with said spindle and of the type adapted for gripping engagement with a generally cylindrical workpiece extending therethrough upon axial movement of said chuck jaw assembly, and means for moving said chuck jaw assembly into an outer gripping engagement with said workpiece, said means for axially moving said chuck jaw assembly including:

a shifter ring carried for rotation with and axial movement on said spindle, at least one finger link pivotally attached to said spindle for pivotal motion in a plane radial to said spindle, each said finger link having a radially inwardly extending finger portion adapted for actuating engagement with said chuck jaw assembly, and a generally axially extending counterweight portion, linkage means connecting each said finger link to said shifter ring and including yielding means adapted to yieldingly urge said counterweight portion of said finger link away from said shifter ring, and means for moving said shifter ring axially along said spindle to thereby urge said chuck jaw assembly into and out of gripping engagement with said workpiece.

2. The structure of claim 1 further characterized in that said shifter ring includes a radially opening circumferential groove and said shifter ring moving means includes at least one shoe adapted to extend within said groove and means for moving each said shoe to thereby move said chuck jaw assembly into and out of gripping engagement with the workpiece, each said shoe being sized for clearance with said groove, and means to prohibit movement of said shoes beyond a predetermined position so that when said chuck jaw assembly is in gripping engagement with said workpiece and said spindle is rotated, each shoe will float within said shifter ring groove.

References Cited

UNITED STATES PATENTS 2,408,596 10/1946 Bednar et al. _____ 72—80
2,960,951 11/1960 Bierman _____ 72—83
3,141,433 7/1964 Bosch _____ 72—81
3,282,078 11/1966 Kaesemeyer _____ 72—85

RICHARD J. HERBST, Primary Examiner

U.S. Cl. X.R.

72—85